April 12, 1927.
H. FROOD
STAIR TREAD
Filed Aug. 27, 1921
1,624,405
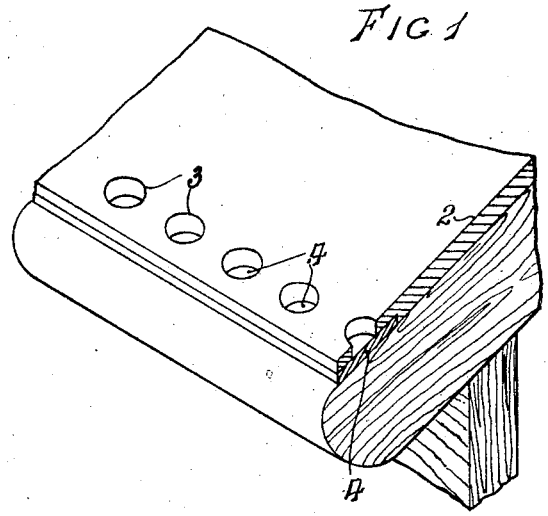
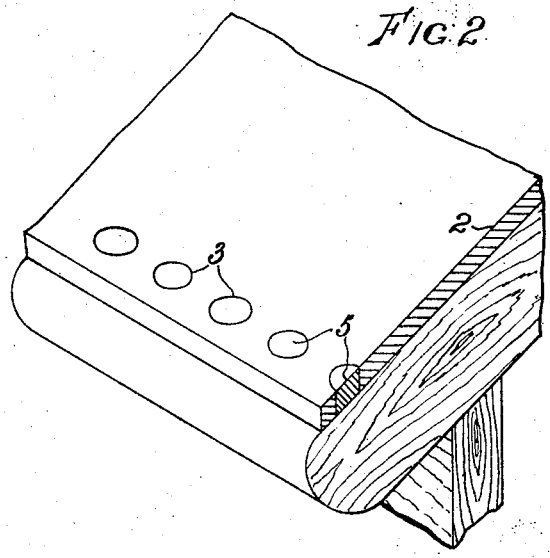
Herbert Frood
Inventor,
By
Rosenbaum, Stockbridge & Borst
Attorneys.

Patented Apr. 12, 1927.

1,624,405

UNITED STATES PATENT OFFICE.

HERBERT FROOD, OF CHAPEL-EN-LE-FRITH, ENGLAND, ASSIGNOR TO FERODO LIMITED, OF CHAPEL-EN-LE-FRITH, ENGLAND.

STAIR TREAD.

(GRANTED UNDER THE PROVISIONS OF THE ACT OF MARCH 3, 1921, 41 STAT. L., 1313.)

Application filed August 27, 1921, Serial No. 496,095, and in Great Britain December 31, 1919.

This invention relates to treads, nosings and the like for stairs and steps, and has for its object to provide in connection with such treads, nosings and the like, means for indicating the front edge or nose of stairs and other steps.

According to this invention, treads, nosings and the like for stairs and steps are provided with perforations or recesses behind, or in, which, is arranged white india rubber or other suitable light coloured material or substance which shows along the treads, nosings or the like near the front edges or noses of the stair or other steps to which they are fitted.

In the accompanying drawings, Figs. 1 and 2 are fragmentary perspective views exemplifying the application of the invention to stair treads.

Referring to the drawings, the stair tread 2, Fig. 1, is provided with a row of perforations 3 near its front edge and a strip 4 of white india rubber or other suitable material may be arranged below the front portion of the tread to show through the perforations.

In the case of a stair nosing, the row of perforations 3 may be arranged near the rear edge of the nosing, the strip 4 of india rubber or other material being arranged below the rear portion of the nosing.

Instead of employing a strip of white india rubber or other suitable material below or behind the perforations 3, the latter may be completely or partially filled in with white india rubber or other suitable material 5, as shown in Fig. 2 so as to show on or near the surface of the tread or nosing. Or the tread or nosing may be formed with recesses which do not extend completely therethrough and are provided with fillings 5.

The perforations or recesses may be of circular, oval, rectangular, lozenge, hexagonal or any other desired shape, and the strip 4 or fillings 5 may be vulcanized or otherwise suitably secured to the underside of the tread or the nosing or in the perforations or recesses.

The treads, nosings or the like are preferably composed of woven or unwoven organic or inorganic fibres or fibrous materials bonded by a suitable cementitious substance, but may be composed of any other suitable material.

What I claim as my invention and desire to secure by Letters Patent is:—

1. A replaceable wear receiving covering for stair treads having along the forward edge portion of its upper surface a distinctive marking in color contrast with the remainder of the covering for indicating the front edge of the tread.

2. A replaceable wear receiving covering for stair treads having along the forward edge portion a row of perforations with material visible through the perforations in strong color contrast with the material of the upper surface of the covering, for indicating the forward edge of the tread.

In witness whereof I have hereunto set my hand.

HERBERT FROOD.